United States Patent [19]

Taleblou et al.

[11] Patent Number: 5,878,159
[45] Date of Patent: Mar. 2, 1999

[54] METHOD FOR PROCESSING ENDOSCOPIC IMAGES OBTAINED WITH MULTICORE FIBERS OR MULTIFIBERS

[75] Inventors: Fatemeh Taleblou, Lausanne; Christian Depeursinge, Preverenges, both of Switzerland

[73] Assignee: Andromis S.A., Geneva, Switzerland

[21] Appl. No.: 850,018

[22] Filed: May 1, 1997

Related U.S. Application Data

[60] Provisional application No. 60/016,703, May 2, 1996.
[51] Int. Cl.$^6$ ....................................... G06K 9/00
[52] U.S. Cl. .......................... 382/128; 382/254; 382/276; 348/65
[58] Field of Search .................................. 382/100, 128, 382/141, 151, 152, 254, 276, 288, 300; 356/73.1; 385/115–117; 348/65, 67, 68, 73; 600/101

[56] References Cited

U.S. PATENT DOCUMENTS

| | | | |
|---|---|---|---|
| 4,480,636 | 11/1984 | Karaki et al. | 128/6 |
| 4,574,311 | 3/1986 | Resnikoff et al. | 358/213 |
| 5,257,100 | 10/1993 | Hattori et al. | 348/65 |
| 5,572,603 | 11/1996 | Koike | 382/199 |
| 5,751,340 | 5/1998 | Strobl et al. | 348/65 |

OTHER PUBLICATIONS

J.P. Pascual Starink, et al., Pattern Recognition Letters, vol. 14, No. 11, pp. 895–905, Nov. 1993, "Localization of Circular Objects".

Ramiro Conde, et al., Optical Engineering, vol. 34, No. 7, pp. 2092–2102, Jul. 1995, "Measurements of the Point Spread Function for Multicore Fibers Used as Image Guides in Microendoscopy".

A. Komiyama, et al., Electronics Letters, vol. 25, No. 16, pp. 1101–1103, Aug. 3, 1989, "Crosstalk and Mode Coupling Between Cores of Image Fibers".

Flavio Sartoretto, Microsoftware for Engineers, vol. 1, No. 2, pp. 133–136, Oct. 1985, "Conversion of Data Between Triangular and Rectangular Meshes for Pre–and Post–Processings in Hydrologic Problems".

Thomas A. Foley, et al., Surveys on Mathematics for Industry, vol. 4, No. 2, pp. 71–84, "Advances in Scattered Data Interpolation".

(List continued on next page.)

Primary Examiner—Leo H. Boudreau
Assistant Examiner—Bhavesh Mehta
Attorney, Agent, or Firm—Oblon, Spivak, McClelland, Maier & Neustadt, P.C.

[57] ABSTRACT

A method and apparatus for processing a digitized image obtained by a multicore fiber or a multifiber, including calculating for each core of the multicore fiber or the multifiber, a transmitted intensity equal to a sum of intensities of pixels of the digitized image located within a predefined zone around each core; calculating a standardized intensity for each core, by dividing the transmitted intensity by an intensity transmitted by a corresponding core in a reference image; and calculating an interpolated value of an intensity of each pixel of the digitized image, as a function of standardized intensities of three cores of a predetermined triangular matrix and a relative position of each pixel with respect to the three cores. A computer program product is provided, including a computer storage medium and a computer program code mechanism embedded in the computer storage medium for causing a computer to process a digitized image obtained by a multicore fiber or a multifiber. The computer program code mechanism, including a first code segment configured to calculate for each core of the multicore fiber or the multifiber, a transmitted intensity equal to a sum of intensities of pixels of the digitized image located within a predefined zone around each core; a second code segment configured to calculate a standardized intensity for each core, by dividing the transmitted intensity by an intensity transmitted by a corresponding core in a reference image; and a third code segment configured to calculate an interpolated value of an intensity of each pixel of the digitized image, as a function of standardized intensities of three cores of a predetermined triangular matrix and a relative position of each pixel with respect to the three cores.

37 Claims, 7 Drawing Sheets

OTHER PUBLICATIONS

Abraham Katzir, Academic Press Inc., vol. 9, pp. 3–19 (630–646), (1987), "Optical Fiber Techniques (Medicine)".

Romain Bollen, SPIE, vol. 626, 1 page, "Correlation Between Measured Noise and Its Visual Perception".

Abraham Katzir, Scientific American, vol. 260, No. 5, pp. 20–25 (120–125), (1989), "Optical Fibers in Medicine".

Stephen M. Pizer, et al., SPIE, vol. 626, pp. 242–250, (1986), "Adaptive Histogram Equlization for Automatic Contrast Enhancement of Medical Images".

Konrad W. Leszczynski, et al., Image and Vision Computing, vol. 7, No. 3, pp. 205–209, Aug. 1989, "A Robust Algorithm for Contrast Enhancement by Local Histogram Modification".

Ramiro Conde, et al, Biomedical Optics'94, pp. 1–8, "Comparative Measurements of Image Quality in Image Gides".

Yongjian Bao, SPIE, Image Processing, vol. 2167, pp. 755–765, (1994), "A Novel Histogram Modification Approach for Medical Image Enhancement".

Stephen M. Pizer, et al., Computer Vision, Graphics, and Image Processing, vol. 39, pp. 355–368, (1987), "Adaptive Histogram Equalization and Its Variations".

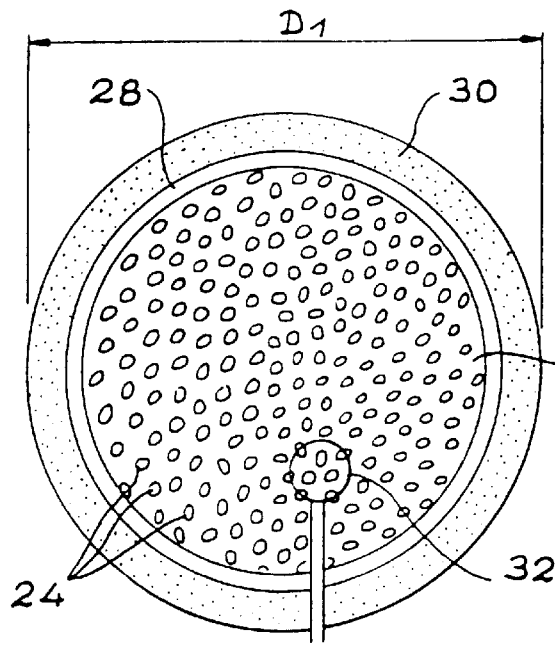
FIG. 1A
FIG. 1B
FIG. 1C
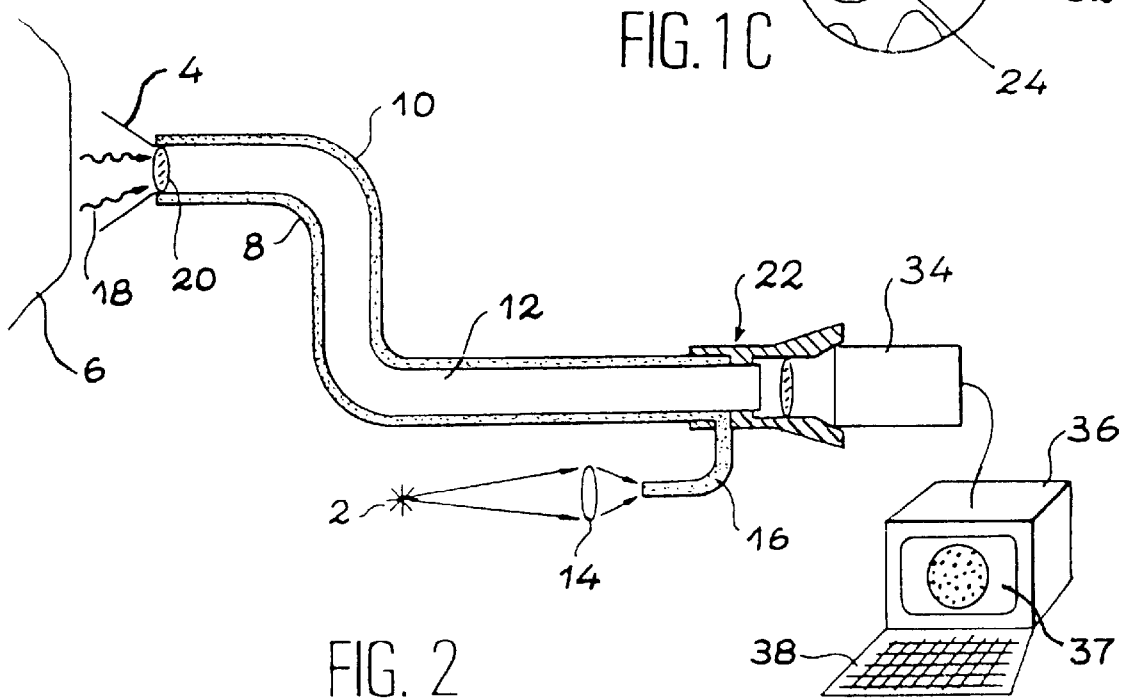
FIG. 2

METHOD FOR PROCESSING ENDOSCOPIC IMAGES OBTAINED WITH MULTICORE FIBERS OR MULTIFIBERS

CROSS REFERENCES TO RELATED APPLICATIONS

This application claims priority to provisional application Ser. No. 60/016,703 filed on May 2, 1996, which is incorporated herein by reference.

BACKGROUND OF THE INVENTION

1. Field of the Invention

The invention relates to the field of the processing of images by multicore optical fibers, and more particularly to the processing of images obtained in microendoscopy by multicore optical fibers.

2. Discussion of Background

As is illustrated in FIG. 1A, a conventional multimode fiber has a core 1 and a shell 3. A multicore fiber is a bundle of fibers, in a merged and stretched state, which consequently forms a continuous assembly. The shell of each individual fiber is melted with the shells of adjacent cores. Accordingly, within a multicore fiber it is only possible to distinguish individual cores, the shells of the fibers being merged with each other.

FIG. 1B is a cross-sectional view of a multicore fiber, the cores 24 and shells 26 being grouped within a first sheath 28, for example made of silica, and a second sheath 30, known as the outer sheath or "black" covering. The external diameter $D_1$ of the assembly can be, for example, approximately 200 to 500 μm wide.

FIG. 1C is a larger scale view of portion 32 of the multicore fiber of FIG. 1B. As shown FIG. 1C, the cores 24 have cross-sections with a variable shape and of varying homogeneity. In particular, the diameter d of each core 24 (i.e., the greatest distance separating two points of the same core) varies between the individual cores. Typically d can vary, for example, between 3 and 4 μm for cores within a multicore fiber. In addition, the average distance between individual cores 24 is not uniform and can vary, for example, from 3 to 3.5 μm within a multicore fiber.

The notion of multicore fibers must be distinguished from that of multifibers which constitute an assembly or bundle of independent fibers placed jointly and optionally bonded at an end. The present invention also applies to multifibers. Multicore fibers and multifibers are used in imaging, particularly in the medical field. Endoscopy and in particular microendoscopy enables a practitioner to acquire information or images of an area within an object, such as organs of the human body, such as the stomach, lungs, heart, etc., by reflecting light off of the object and receiving the reflected light into multicore fibers or multifibers.

FIG. 2 shows an apparatus for performing an endoscopy or microendoscopy procedure, including light source 2 which is focused by a lens 14 into a light inlet guide 16. The light inlet guide 16 is typically connected to a plurality of optical fibers 8 and 10 located at the periphery of a multicore fiber 12. A light beam generated by light source 2 through lens 14 can thus be directed onto a zone of an object or organ 6 to be observed. The object or organ 6 reflects a radiation 18 to the inlet 20 of the multicore fiber 12. Since the multicore fiber 12 has a coherent bundle of individual cores, the multicore fiber 12 transmits the received light of an obtained image of the object or organ 6 in well-ordered manner to an outlet 22 of the multicore fiber 12. The image at the outlet 22 of the multicore fiber 12 corresponds to an image of the object or organ 6 formed at the inlet 20. Means for receiving the obtained object image, such as camera 34 or any other display means, and means for storing, analyzing and/or representing the image, such as computer 36 with display 37, and keyboard 38 can also be provided in conjunction with the above apparatus.

The above imaging procedure is described, for example, in A. Katzir, "Optimal Fibers in Medicine", Scientific American, vol. 260(5), pp 120–125, 1989, and "Optimal Fiber Techniques (Medicine)", Encyclopedia of Physical Science and Technology, vol. 9, pp 630–646, 1987. In practice, a multicore fiber like multicore fiber 12 of FIG. 2 can have approximately 700 to 10,000 cores for microendoscopic applications. To obtain an image using a microendoscope, a network of cores of the cores of the multicore fiber 12 transmit the reflected unprocessed object image. This network is constituted by almost circular regions, each corresponding to a core.

The practitioner or person examining an image obtained by microendoscopy or more generally obtained with the aid of a multicore fiber, can consequently not use the crude or unprocessed image obtained at the multicore fiber outlet and the image requires digital processing in order to obtain a usable image. R. Condé et al, "Comparative Measurements of Image Quality in Image Guides", Biomedical Optics '94, describes processing of a test image of a Ronchi grid obtained by a multicore fiber. However, R. Condé et al provides no information on a practical implementation of such processing which requires a large mass of image data to be processed (typically 512×512 pixels) from each image obtained by a multicore fiber.

SUMMARY OF THE INVENTION

Accordingly, an object of the present invention is to provide a method of processing a digitized image obtained by a multicore fiber or a multifiber so as to obtain a continuous intensity distribution of the obtained image.

Another object of the present invention is to provide a method of processing a digitized image obtained by a multicore fiber or a multifiber for rendering a network of cores of the cores of the multicore fiber or multifiber transmitting an object image, the network of cores constituted by circular regions, each circular region corresponding to a core.

Another object of the present invention is to provide a method of processing a digitized image obtained by a multicore fiber or a multifiber wherein standardizing or calibrating a response of each core makes it possible to take account of response differences of individual cores to an input signal. These response differences are inter alia due to the fact that the distance between the cores varies in the network of fibers, so that there are couplings between the cores. For each propagation mode within an individual core, there is an evanescent field spatially distributed in the intercore zones and adjacent cores. The higher the order of the propagation mode the greater the evanescent field. Thus, for an incident intensity $I_0$ at the inlet of a core, the core transmits at an outlet a certain intensity $I_0 - i_0$, while adjacent cores transmit an intensity $i_0$. Distance variations between adjacent cores consequently lead to intensity variations, represented by $i_0$, transmitted from one core to an adjacent core.

Another object of the present invention is to provide a method of processing a digitized image obtained by a multicore fiber or a multifiber wherein a definition zone around each core of the multicore fiber or a multifiber is obtained with the aid of core barycenters or maximum intensity points using geometrical calculations.

Another object of the present invention is to provide a method of processing a digitized image obtained by a multicore fiber or a multifiber wherein an interpolated object image is enhanced improving object image contrast.

Another object of the present invention is to provide a method of processing a digitized image obtained by a multicore fiber or a multifiber wherein for each core of all the reference elements a barycenter or maximum intensity pixel and a definition zone around each core are calculated and reused for an object image.

Another object of the present invention is to provide a method of processing a digitized image obtained by a multicore fiber or a multifiber wherein a digital mask calculation makes it possible to apply processing operations solely to cores of the multicore fiber or a multifiber in a zone defined by the digital mask, reducing a number of operations and a calculation time.

Another object of the present invention is to provide a method of processing a digitized image obtained by a multicore fiber or a multifiber wherein each pixel of the digitized image is allocated to a zone around a core of the multicore fiber or a multifiber.

Another object of the present invention is to provide a method of processing a digitized image obtained by a multicore fiber or a multifiber wherein a calculation of a midperpendicular between two points with defined coordinates is implemented using simple geometrical calculations.

Another object of the present invention is to provide a method of processing a digitized image obtained by a multicore fiber or a multifiber wherein a calculation of surfaces defined by midperpendiculars between two points with defined coordinates is implemented using simple geometrical calculations in order to reduce a complexity of operations performed and to compensate for the large number of cores that are processed within a multicore fiber (i.e., several thousands of cores per multicore fiber).

Another object of the present invention is to provide a method of processing a digitized image obtained by a multicore fiber or a multifiber wherein all cores, including cores merged with adjacent cores, can be processed in a reference image and an object image.

Another object of the present invention is to provide a method of processing a digitized image obtained by a multicore fiber or a multifiber wherein calculation time is reduced by approximately a factor of 2 by distinguishing between triangles formed by sets of three cores having two horizontally aligned apices and triangles which do not.

The above and other objects are achieved according to the present invention by providing a method for processing a digitized image obtained by a multicore fiber or a multifiber, including calculating for each core of the multicore fiber or the multifiber, a transmitted intensity equal to a sum of intensities of pixels of the digitized image located within a predefined zone around each core; calculating a standardized intensity for each core, by dividing the transmitted intensity by an intensity transmitted by a corresponding core in a reference image; and calculating an interpolated value of an intensity of each pixel of the digitized image, as a function of standardized intensities of three cores of a predetermined triangular matrix and a relative position of each pixel with respect to the three cores.

According to a second aspect of the present invention, there is provided a method for processing a digitized image obtained by a multicore fiber or a multifiber, using a reference image obtained from the multicore fiber or the multifiber, including determining a barycenter or maximum intensity pixel for each core of the multicore fiber or the multifiber on the reference image; calculating a definition zone around each core; calculating a transmitted intensity equal to a sum of intensities of pixels of the digitized image located within the definition zone for each core of the multicore fiber or the multifiber; calculating a standardized intensity by dividing the transmitted intensity of each core by an intensity transmitted by each core in the reference image for each core of the multicore fiber or the multifiber; and calculating an interpolated value of an intensity as a function of the standardized intensities of three cores of a predetermined triangular matrix and a relative position of each pixel with respect to the three cores for each pixel of the digitized image.

According to a third aspect of the present invention, there is provided a method for processing a reference image obtained by a multicore fiber or a multifiber, including determining a barycenter or maximum intensity pixel of each core of the multicore fiber or the multifiber; and calculating a definition zone around each core.

According to a fourth aspect of the present invention, there is provided an apparatus for processing a digitized image obtained by a multicore fiber or a multifiber, including means for calculating for each core of the multicore fiber or the multifiber, a transmitted intensity equal to a sum of intensities of pixels of the digitized image located within a predefined zone around each core; means for calculating a standardized intensity for each core, by dividing the transmitted intensity by an intensity transmitted by a corresponding core in a reference image; and means for calculating an interpolated value of an intensity of each pixel of the digitized image, as a function of standardized intensities of three cores of a predetermined triangular matrix and a relative position of each pixel with respect to the three cores.

According to a fifth aspect of the present invention, there is provided an apparatus for processing a digitized image obtained by a multicore fiber or a multifiber, using a reference image obtained from the multicore fiber or the multifiber, including means for determining a barycenter or maximum intensity pixel for each core of the multicore fiber or the multifiber on the reference image; means for calculating a definition zone around each core; means for calculating, for each core of the multicore fiber or the multifiber, a transmitted intensity, equal to a sum of intensities of pixels of the digitized image located within the definition zone; means for calculating, for each core of the multicore fiber or the multifiber, a standardized intensity, by dividing the transmitted intensity of each core, by an intensity transmitted by each core in the reference image; and means for calculating, for each pixel of the digitized image, an interpolated value of an intensity, as a function of the standardized intensities of three cores of a predetermined triangular matrix and a relative position of each pixel with respect to the three cores.

According to a sixth aspect of the present invention, there is provided an apparatus for processing a digitized image obtained by a multicore fiber or a multifiber, including a first processor section configured to calculate for each core of the multicore fiber or the multifiber, a transmitted intensity equal to a sum of intensities of pixels of the digitized image located within a predefined zone around each core; a second processor section configured to calculate a standardized intensity for each core, by dividing the transmitted intensity by an intensity transmitted by a corresponding core in a reference image; and a third processor section configured to calculate an interpolated value of an intensity of each pixel of the digitized image, as a function of standardized intensities of three cores of a predetermined triangular matrix and a relative position of each pixel with respect to the three cores.

According to a seventh aspect of the present invention, there is provided an apparatus for processing a digitized image obtained by a multicore fiber or a multifiber, using a reference image obtained from the multicore fiber or the multifiber, including a first processor section configured to determine a barycenter or maximum intensity pixel for each core of the multicore fiber or the multifiber on the reference image; a second processor section configured to calculate a definition zone around each core; a third processor section configured to calculate, for each core of the multicore fiber or the multifiber, a transmitted intensity, equal to a sum of intensities of pixels of the digitized image located within the definition zone; a fourth processor section configured to calculate, for each core of the multicore fiber or the multifiber, a standardized intensity, by dividing the transmitted intensity of each core, by an intensity transmitted by each core in the reference image; and a fifth processor section configured to calculate, for each pixel of the digitized image, an interpolated value of an intensity, as a function of the standardized intensities of three cores of a predetermined triangular matrix and a relative position of each pixel with respect to the three cores.

According to an eighth aspect of the present invention, there is provided a computer program product, including a computer storage medium and a computer program code mechanism embedded in the computer storage medium for causing a computer to process a digitized image obtained by a multicore fiber or a multifiber. The computer program code mechanism includes a first code segment configured to calculate for each core of the multicore fiber or the multifiber, a transmitted intensity equal to a sum of intensities of pixels of the digitized image located within a predefined zone around each core; a second code segment configured to calculate a standardized intensity for each core, by dividing the transmitted intensity by an intensity transmitted by a corresponding core in a reference image; and a third code segment configured to calculate an interpolated value of an intensity of each pixel of the digitized image, as a function of standardized intensities of three cores of a predetermined triangular matrix and a relative position of each pixel with respect to the three cores.

According to an ninth aspect of the present invention, there is provided a computer program product, including a computer storage medium and a computer program code mechanism embedded in the computer storage medium for causing a computer to process a digitized image obtained by a multicore fiber or a multifiber, using a reference image obtained from the multicore fiber or the multifiber. The computer program code mechanism includes a first code segment configured to determine a barycenter or maximum intensity pixel for each core of the multicore fiber or the multifiber on the reference image; a second code segment configured to calculate a definition zone around each core; a third code segment configured to calculate, for each core of the multicore fiber or the multifiber, a transmitted intensity, equal to a sum of intensities of pixels of the digitized image located within the definition zone; a fourth code segment configured to calculate, for each core of the multicore fiber or the multifiber, a standardized intensity, by dividing the transmitted intensity of each core, by an intensity transmitted by each core in the reference image; and a fifth code segment configured to calculate, for each pixel of the digitized image, an interpolated value of an intensity, as a function of the standardized intensities of three cores of a predetermined triangular matrix and a relative position of each pixel with respect to the three cores.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIG. 1A is a cross-sectional view of an optical fiber;

FIGS. 1B and 1C are cross-sectional views of a multicore fiber;

FIG. 2 is a diagrammatic representation of an endoscope;

DESCRIPTION OF THE PREFERRED EMBODIMENTS

Figure 3:
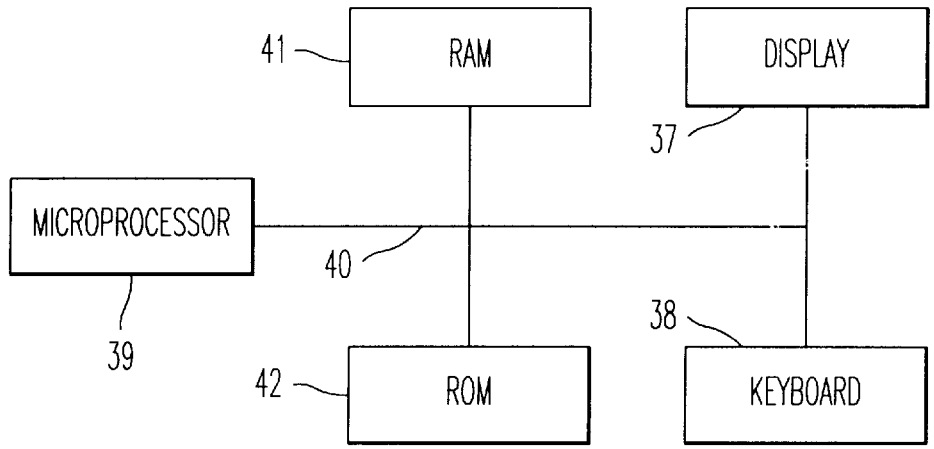
FIG. 3 a block diagram representation of the data processing system of FIG. 2.

Referring now to the drawings, wherein like reference numerals designate identical or corresponding parts throughout the several views, and more particularly to FIG. 2 thereof, there is illustrated an apparatus for processing of an endoscopic image including multicore fiber 12, camera 34 and computer 36.

The processing of an endoscopic image according to the present invention can be implemented, for example, with the aid of the previously described apparatus as shown in FIG. 2. The images of an object 6 obtained at an outlet 22 is displayed by the camera 34 or any other display means, for example, connected to the computer 36. The computer 36 includes a display 37, a keyboard 38, a calculation section (not shown), such a microprocessor with all necessary electronic components, for processing of images obtained from the camera 34. The display 37 is used to display images processed according to the present invention.

FIG. 3 is a simplified block diagram of components of the computer 36 of FIG. 2. In FIG. 3, a microprocessor 39 is connected by a bus 40 to RAM 41 used for storing data and program instructions and to a ROM 42 for storing firmware related to the microprocessor 39, such as an operating system. The program instructions stored in RAM 41 could also be stored in ROM 42 in which case the computer 36 would be permanently programmed to perform the process according to the present invention until the ROM 42 is reprogrammed or replaced. The program instruction stored in RAM 41 and/or ROM 42 are used to implement the process according to the present invention. Note that the computer 36 may also include other components, such as a mouse, a floppy drive, a CD ROM drive, a magneto-optical drive, a modem, a scanner, a facsimile, or other peripheral devices, etc. which are not shown for the sake of simplicity. The program instructions that get stored in RAM 41 can be transferred to the computer system 36 from a storage medium, such as a floppy disk, CD ROM disk, magneto-optical disk, hard disk, etc. via an appropriate drive, such as a floppy drive, CD ROM drive, magneto-optical drive, hard drive, etc. The computer system 36 also includes a display 37 and a keyboard 38. A personal computer, such as a Power PC (800-80 AV) can be used as the computer 36 according to the present invention.

The apparatus shown in FIG. 2 permits an "immediate" exploitation by a surgeon of processed images. In the case of medical images, the surgeon may be a qualified practitioner who is able to analyze the processed images. In other cases, the surgeon, or a general practitioner, will not know how to analyze the processed image. In this case, the processed images can be stored and supplied or transmitted to an analysis site, such as a specialized analysis laboratory. On the basis of the processed images, the laboratory makes a diagnosis, which it then sends to the general practitioner. The general practitioner can then send the patient to a specialist, on the basis of the diagnosis. The complete apparatus illustrated in FIG. 2 (multicore fiber 12, camera 34 and computer 36) has small overall dimensions and can consequently easily form part of necessary instrumentation of a general practitioner. The transmission of the processed images to a remote analysis site or laboratory can be accomplished by any appropriate means, such as by storing the images on floppy disks and sending them to the laboratory through regular mail or via electronic transmission. Electronic transmission of the processed images to the remote analysis site or laboratory could include, for example, transmission of the processed images via a modem, via facsimile, and/or via a computer network, such as a Novell network or the Internet, etc.

Figure 4A:
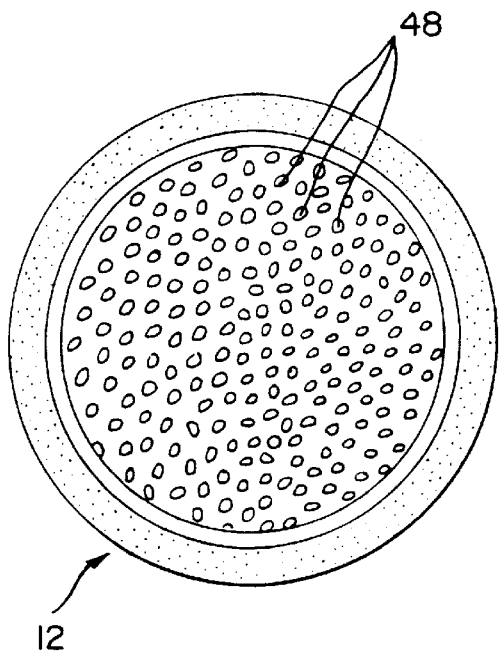
FIGS. 4A and 4B illustrate unprocessed images obtained with the aid of a multicore fiber, with a reference image generated using white light shown in FIG. 4A and an object image shown in FIG. 4B.
Figure 4B:
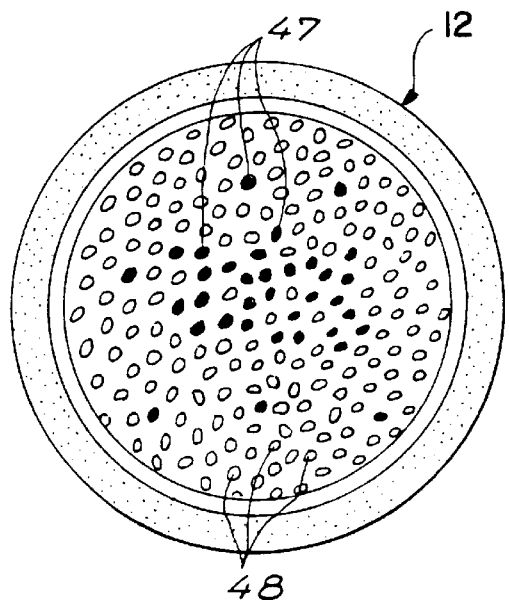

FIGS. 4A and 4B respectively show, for example, a reference image obtained using white light, and an object image reflected from an object 6 at the outlet 22 of the multicore fiber or multifiber 12 of FIG. 2. Each image represents a network of individual cores of the multicore fiber or multifiber 12. This network is constituted by almost circular regions, each corresponding to a core. FIG. 4B shows an obtained image in a crude or unprocessed form. The obtained image is typically unusable by a practitioner or surgeon and requires processing to enable the practitioner or surgeon to read and interpret the image. Accordingly, the processing according to the present invention enables the surgeon or practitioner to obtain a usable image on the basis of the unprocessed, typically unusable image of FIG. 4B.

In FIG. 4A, the reference image obtained by exposing the multicore fiber 12 to a uniform white light is shown. For this purpose, a white light source is placed at the inlet 20 of the multicore fiber 12 in place of the object 6 in FIG. 2. FIG. 4B shows an object image obtained when a body or object 6 of FIG. 2 is examined. The source 2 emits radiation which will illuminate the body or object 6 which in turn reflects radiation into cores 47 of the multicore fiber 12. This reflected radiation forms an image containing information of the body or object 6 which will be processed. The cores 47 are cores transmitting reflected light from the body or object 6, and the cores 48 are cores that are not transmitting reflected light from the body or object 6.

Figure 5:
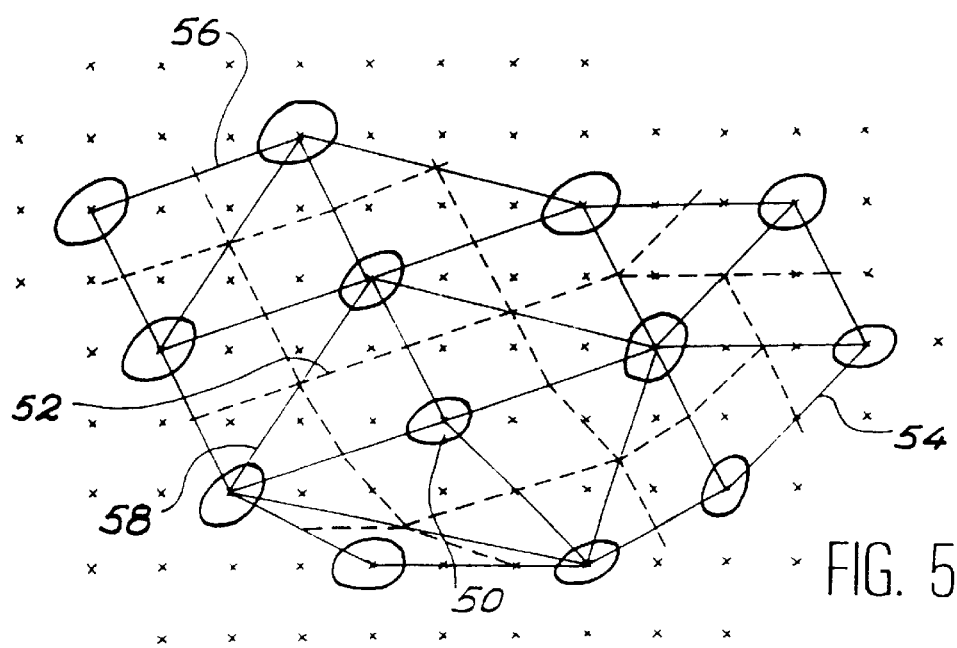
FIG. 5 illustrates cores of an obtained image, pixels of the image and geometrical zones of the image for processing of the obtained image according to the present invention.

The reference image and the object image constitute an image of N×N points or pixels (e.g., 512×512 pixels). Each pixel corresponds a digital value, a digitized intensity, which is determined as function of the position p(x, y) of the point or pixel in the plane of the image. FIG. 5 shows the superimposition of part of the unprocessed image of FIG. 4B, representative of the object image reflected in the cores, with pixels of the image to be processed symbolized by crosses. In FIG. 5, pixels located within cores and other pixels located between adjacent cores are shown. The number of pixels and the number of cores shown in FIG. 5 are not to scale and are not in a relationship corresponding to a real application, but are shown in a simplified form to explain the processing according to the present invention. In practice, an image can comprise several thousand cores with more than 250,000 pixels (e.g., for a 512×512 pixel processed image). Therefore the part of the object image which corresponds to each core is formed by a group of pixels having certain intensities. As will be further discussed, it is possible to represent each core by a single pixel which collects the average information or intensity of the pixels forming the core image and to associate with each core coordinates of a point which is, for example, the barycenter or centroid of the pixels forming the core image. This barycenter is allocated an intensity, which can be the sum of the intensities of the pixels forming the image of the core in question.

In order to render a usable image from the network of cores, it is necessary to determine, for the pixels located in the intercore regions as shown in FIG. 5, new intensity values. The intensity values are obtained by interpolating intensities of three adjacent cores. According to the present invention, a processing on the basis of the three "closest" cores of each pixel permits an effective interpolation in an acceptable time frame from a practical standpoint. For each pixel, three cores used for the interpolation, or a triangle defined by these three cores, can be defined in a reference image and used for all object images (assuming the same multicore fiber is used to generate the object images).

FIG. 5 shows part of a reference image wherein interpolation triangles 54, 56 and 58 are identified. Each pixel, within a given triangle, is allocated a code corresponding to the triangle. Such a code can be, for example, a core number, if the cores are numbered, or coordinates of the centers or barycenters of the cores making up the triangle. Using a core number is preferable, since this technique requires less space for storing the triangle information for each pixel as compared to storing the coordinates of the centers or barycenters of the cores making up the triangle. As previously discussed, each core could be referenced by a single point allocated a global intensity. However, to obtain a precise evaluation of a response of each core to an input signal, each core is associated with a sum of intensities of pixels located within a zone 52, called a definition zone. A procedure for determining the definition zones will be explained later.

Figure 6:
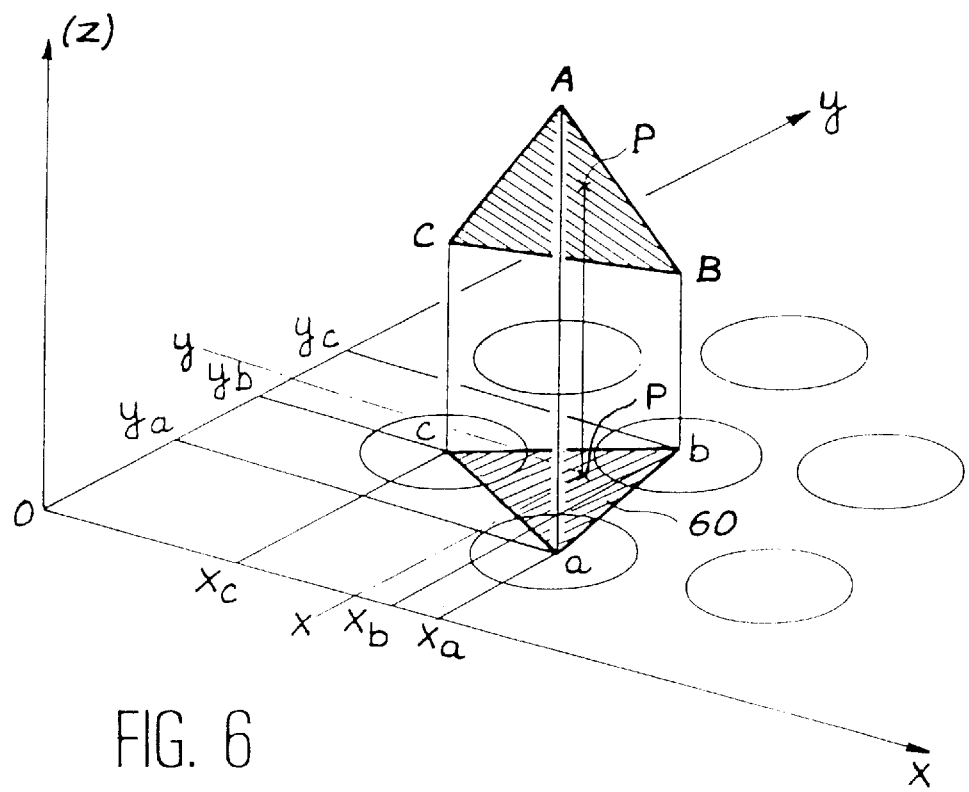
FIG. 6 diagrammatically illustrates a process for interpolating an intensity of three cores transmitting an obtained image for pixels of a digitized image of the obtained image between the three cores according to the present invention.

FIG. 6 is used to explain the interpolation procedure according to the present invention. In FIG. 6, an integrated intensity I associated with each core (i.e., obtained in the manner previously described) is plotted on the z axis as a function of the position (x, y) of the core (e.g., its barycenter). In FIG. 6 to cores a, b and c, have respective coordinates $(x_a, y_a)$, $(x_b, y_b)$, $(x_c, y_c)$ and correspond to points $A(x_a, y_a, I_a)$, $B(x_b, y_b, I_b)$, $C(x_c, y_c, I_c)$ in the xyz space. A bilinear interpolation is calculated based on a triangular surface A, B, C determined by the respective barycenters and integrated intensities of three cores a, b and c. The intensity of pixels within a triangular zone 60 between the cores a, b and c (e.g., pixel p) are replaced by an interpolated intensity values. The interpolated intensity value for each pixel within the triangular zone 60 is a function of the distance of a given pixel from the apices a, b and c, and the intensities allocated to each of the cores a, b and c. More specifically, considering the interpolated point P in the triangular A, B, C, the following relationship is obtained:

$$\overline{OP} = \overline{OA} + \overline{AP} = \overline{OA} + (\alpha \overline{AB} + \beta \overline{AC}),$$

or, in terms of Cartesian coordinates:

$$x_p = x_a + \alpha(x_b - x_a) + \beta(x_c - x_a) \quad (2.1)$$

$$y_p = y_a + \alpha(y_b - y_a) + \beta(y_c - y_a) \quad (2.2)$$

$$z_p = z_a + \alpha(z_b - z_a) + \beta(z_c - z_a) \quad (2.3)$$

From the above equations it is possible to deduce $z_p$, which is the interpolated intensity value associated with the pixel p. Using the above equations the interpolated intensity values for all pixels within a given triangular region consisting of three cores can be calculated.

The processing allocates an intensity to point (e.g., barycenter) corresponding to the global intensity carried by a core of the multicore fiber for every core of the multicore fiber. The intensity points for all the cores of the multicore fiber can be generated relative to a reference image as will now be described. For each individual core, the processing makes it possible to identify a particular point in the core, allocate an intensity that point corresponding to the global intensity carried by the core (this part of the processing is summarized in flowchart form in FIG. 10) and, for each pixel, with reference to three cores, calculate an interpolated intensity of each pixel in the manner previously described. Before performing the above processing, it is preferable to define a circular surface, or digital mask, of cores within the multicore fiber which transmit useful information. By defining such a circular surface, a gain in the calculation time and the number of operations is obtained since only pixels within the circular surface need to be processed.

Figure 7A:
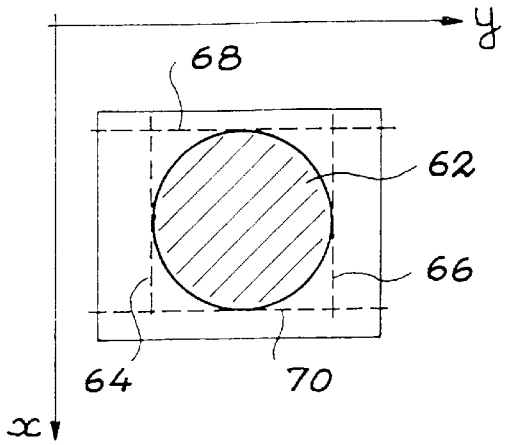
FIGS. 7A and 7B illustrate a masking procedure used for processing of a reference image according to the present invention.
Figure 7B:
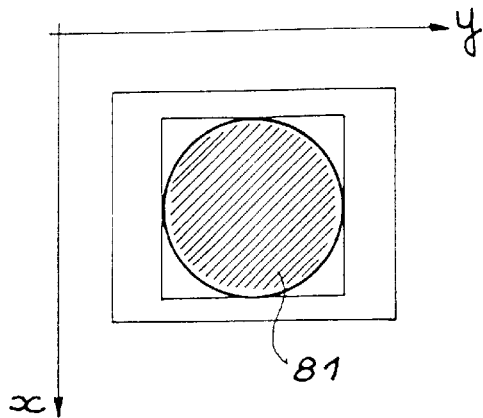
Figure 7C:
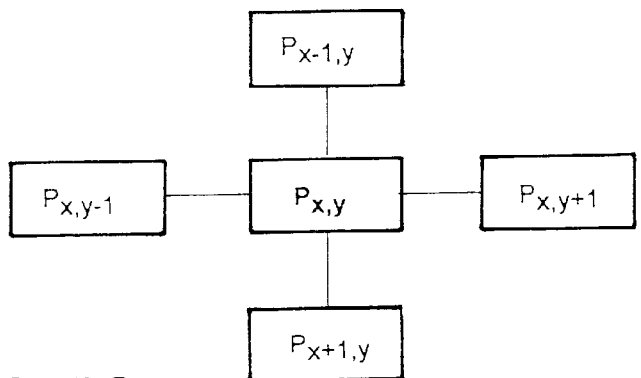
FIGS. 7C to 7E illustrate a grouping or segmentation procedure used for grouping pixels of a reference image with corresponding cores of the a multicore fiber according to the present invention.

By defining the digital mask for the image transmitted by the cores of the multicore fiber, it possible to distinguish pixels of the multicore fiber and pixels located in a region between the cores of the multicore fiber and the outer fiber sheath (sheath 30 in FIG. 1B). FIG. 7A shows the reference image obtained when cores of the multicore fiber are illuminated with white light. Reference numeral 62 designates a circular surface covering all of the cores of the multicore fiber which transmit useful information for processing an image. The determination of a digital mask, which defines the surface, makes in possible to process image information solely within the region and therefore reduce a number of operations and a calculation time. This is accomplished by sweeping from left to right each row of the reference image (i.e., the image obtained with white light illumination) to form a matrix intensities corresponding to pixels having an intensity above a given threshold. In this way, a minimum order column from the left of the matrix is used to determine the left edge 64 of the digital mask. In the same way, the right edge 66, the upper edge 68, and the lower edge 70 are determined. The threshold applied (the same for all the sides of the image) is defined in accordance with an image noise level. The pixels located within the image 62 are coded 0 while the other pixels are coded to 1. This code is recorded in a matrix of the same size as the reference image and defines the digital mask used to process an object image. In this same way, each core of the multicore fiber can be digitally masked and FIG. 7B shows, for example, a mask 81 generated and coded for one core of the cores of the multicore fiber according to the present invention.

The method to determine, for each core, a point (e.g., barycenter) which will represent the entire core and to which will be allocated a global intensity will now be discussed with reference to FIGS. 7A to 7E and the flowchart of FIG. 10. A search to determine pixels corresponding to a given core takes place in accordance with a region growth segmentation method. The method makes it possible to regroup or collect contiguous pixels belonging to a same core. For each pixel of the reference image 62 of FIG. 7A, four connections are defined in accordance with the diagram of FIG. 7C. For each connection, a threshold T is defined (FIG. 10, step 80), such that for any pixel with coordinates $(x_1, y_1)$:

if $I_p(x_1, y_1) > T$, then $p(x_1, y_1) C_k$, where $I_p(x_1, y_1)$ designates the intensity of a pixel with coordinates $(x_1, y_1)$, $p(x_1, y_1)$ designates a pixel with coordinates $(x_1, y_1)$, and $C_k$ designates a core number k associated with the pixel $p(x_1, y_1)$. When all pixels corresponding to a given core are collected, a number k is allocated to the corresponding core (FIG. 10, step 82). The collection method is applicable recursively for every pixel having four connections. In a case of pixels with less than four connections, for example, pixels located at the edge of the image, the search is stopped in this direction of the edge pixel but continues in another direction. In this way, all pixels corresponding to a given core are determined and each core is given a core number k.

Once the pixels of a same core $C_k$ are collected, the core is limited (FIG. 10, step 84) by a window or surface having:

(a) an upper edge is defined by a pixel p(x, y), whose ordinate y is a maximum out of the ordinates y of pixels corresponding to core $C_k$;

(b) a lower edge is defined by a pixels p(x, y), whose ordinate y is minimum out of the ordinates y of pixels corresponding to core $C_k$;

(c) a left lateral edge is defined by a pixel p(x, y), whose abscissa x is minimum out of the abscissas x of pixels corresponding to core $C_k$; and (d) a right lateral edge is defined by the pixel p(x, y), whose abscissa x is maximum out of the abscissas x of pixels corresponding to core $C_k$. Once the above calculations are performed, it is then possible to calculate the barycenter of the pixels associated with a core $C_k$ (FIG. 10, step 86). Among the pixels of a given core, it is also possible to determine the maximum intensity pixel in the reference image.

The threshold T used in the above calculations, is determined on the basis of a cumulative histogram of intensities of the reference image while only taking account pixels located within the digital mask applied to the reference image of the multicore fiber and based on information supplied by a manufacturer of the multicore fiber. More specifically, the threshold T is determined based on the core diameter, the number of cores of in the multicore fiber, and an average number of pixels is calculated according to the following relation:

$$N_{pc}=(N_{pb} \times A_{mc})/A_{mb}$$

in which $A_{mc}$ designates the surface of a core (in $\mu m^2$) calculated on the basis of the diameter of the core, $A_{mb}$ designates the surface of the section of the multicore fiber (in $\mu m^2$) defined according to the manufacturer's data, $N_{pb}$ designates the number of pixels in the reference image of the multicore fiber, or the surface of the section of the multicore fiber in pixels defined on the basis of the cumulative histogram, and $N_{pc}$ designates the number of pixels of the core, or the mean surface of each individual core, in pixels.

Figure 7D:
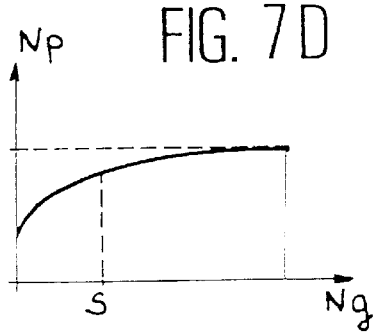

It is possible for fibers of the multicore fiber to deform when the fibers are hot drawn resulting in an increase or decrease in a given direction of the respective core diameters of the fibers. In this case, the cores no longer have a circular shape, so that the number of pixels associated with each core varies and a mean value of pixels per core must be determined. By multiplying the total number of cores by the mean surface area of each core (i.e., the mean value of pixels/core), the "useful" surface of the multicore fiber is obtained. On the basis of a cumulative histogram as illustrated in FIG. 7D and a grouping on the abscissa of cumulative grey levels and on the ordinate the number of pixels, grey levels corresponding to the "useful" surface can be defined. For each class of grey levels, a histogram is provided which gives a number of pixels whose grey level is in a given class and in a lower grey level class. The segmentation threshold T is defined by the grey level value corresponding to the useful surface, measured in pixels. The search takes place by displacing the line S towards the left (in grey level), on the cumulative histogram, until the value of the useful surface (in numbers of pixels) of the cores is reached thus determining the segmentation threshold T.

Figure 7E:
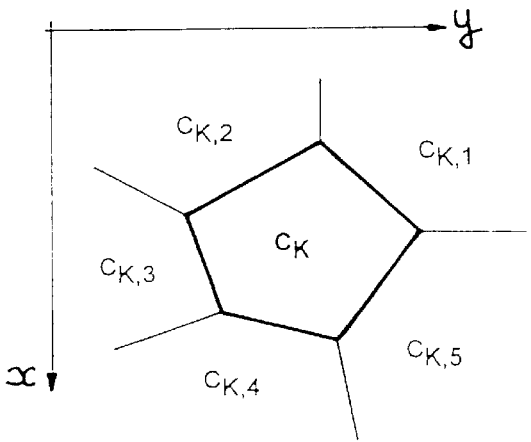

A response of each core to the light signal which a given core receives is defined by the sum of the intensities of the pixels belonging to the core and will be discussed with reference to FIG. 7E. In order to obtain a precise evaluation of the response of a given core, a surface is associated for each core, for example, defined by the midperpendiculars between a central core $C_k$ and each of the adjacent cores $C_{K1}$, $C_{K2}$, . . . $C_{K5}$, as shown in FIG. 7E. In even a more precise manner, the midperpendiculars are taken between the barycenter (or centroid, or maximum intensity point) of a core and the barycenter (or centroid, or maximum intensity point) of each of the adjacent cores. Other definitions are possible, but using midperpendiculars makes it possible to divide the surface of the bundle of cores into adjacent polygons as shown in FIG. 7E. Moreover, in this way each pixel of an image belongs to a single region $C_K$. This division method is easy to perform for the few thousand cores which may exist in a multicore fiber.

Figure 8:
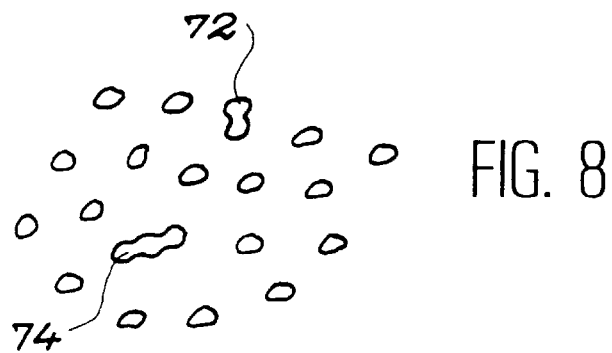
FIG. 8 illustrates part of a reference image having merged cores.

The processing according to the present invention with regard to a case of merged cores will now be discussed with reference to FIGS. 8 and 9A to 9C. During the production of multicore fibers, certain individual cores can be sufficiently close to one another during the hot drawing so as to merge with each other. The image of these individual cores, on the reference image or on an object image, is no longer substantially circular, as in FIG. 5, but is instead elongated as illustrated in FIG. 8. In FIG. 8, part of a section of a multicore fiber having groups of merged cores 72 and 74 with extension in a given direction are shown. FIG. 8 shows, for example, a group 72 consisting of two merged cores and a group 74 consisting of three merged cores. A determination is made (FIG. 10, step 88) on the pixels of an image surface of each core, obtained by regrouping in the manner previously explained, as to whether or not merged cores exist. Thus, using a threshold with regard to a number of pixels in a given core $C_k$, it is determined whether or not there is a merging of several cores (FIG. 10, step 92). This threshold is given by the relation:

$$N_{pf}>(1+\Delta_n)N_{pc}$$

in which $N_{pf}$ designates the number of pixels calculated in a merged core, $N_{pc}$ designates the number of pixels of the core, or the mean surface of each individual core, in pixels, as previously discussed, and a parameter $\Delta_n$ is dependent on the significance of the intermodulation effect (or coupling between cores, as previously discussed) at the level of the image. The parameter $\Delta_n$ is a unitless parameter which typically varies between 0.3 and 0.8 and is dependent on the global threshold value T. For example, in the case of a multicore fiber comprising 6,000 cores with little coupling effect, a $\Delta_n$ value in the range of 0.6 to 0.7 is used. However, for a multicore fiber with 10,000 cores, where the coupling effect is relatively high, a $\Delta_n$ value in the range of 0.3 to 0.4 is used. Accordingly, if a given core has a number of pixels exceeding $N_{pf}$ it is determined that the given core comprises merged cores (FIG. 10, step 92).

Figure 9A:
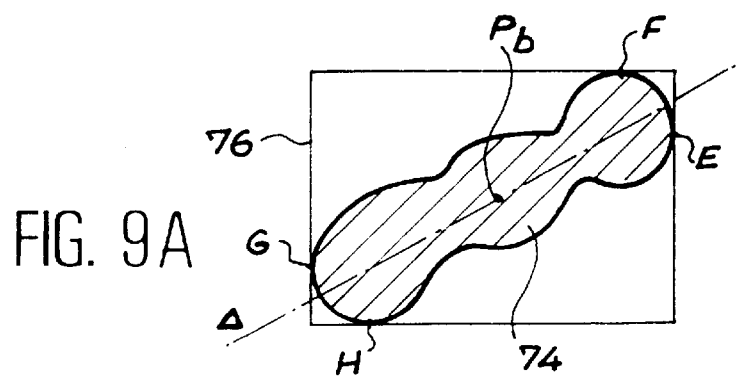
FIGS. 9A to 9C illustrate various steps in processing groups of merged cores according to the present invention.
Figure 9B:
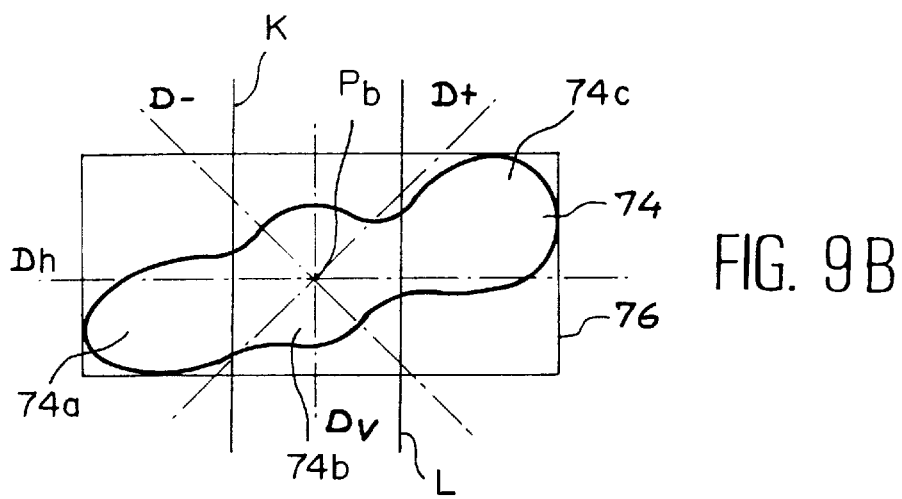

Once a group of merged cores has been detected, the contribution of each of the individual cores of a merged core group on an image obtained with a multicore fiber must be determined. For each group of merged cores, for example group 74 of FIG. 8, a circumscribing window 76 as shown in FIG. 9B surrounding the group of merged cores 74 is determined. In FIG. 9A, the window 76 passes through four points or pixels, G and E, and F and H, which are respectively the pixels furthest to the left and right, and the highest and lowest pixels of the pixels belonging to the group of merged cores 74. The geometrical barycenter $P_b(x, y)$ of the pixels within the group 74 is then determined. Then a mean is formed of the row numbers and column numbers of all the pixels belonging to the group 74.

Figure 10:
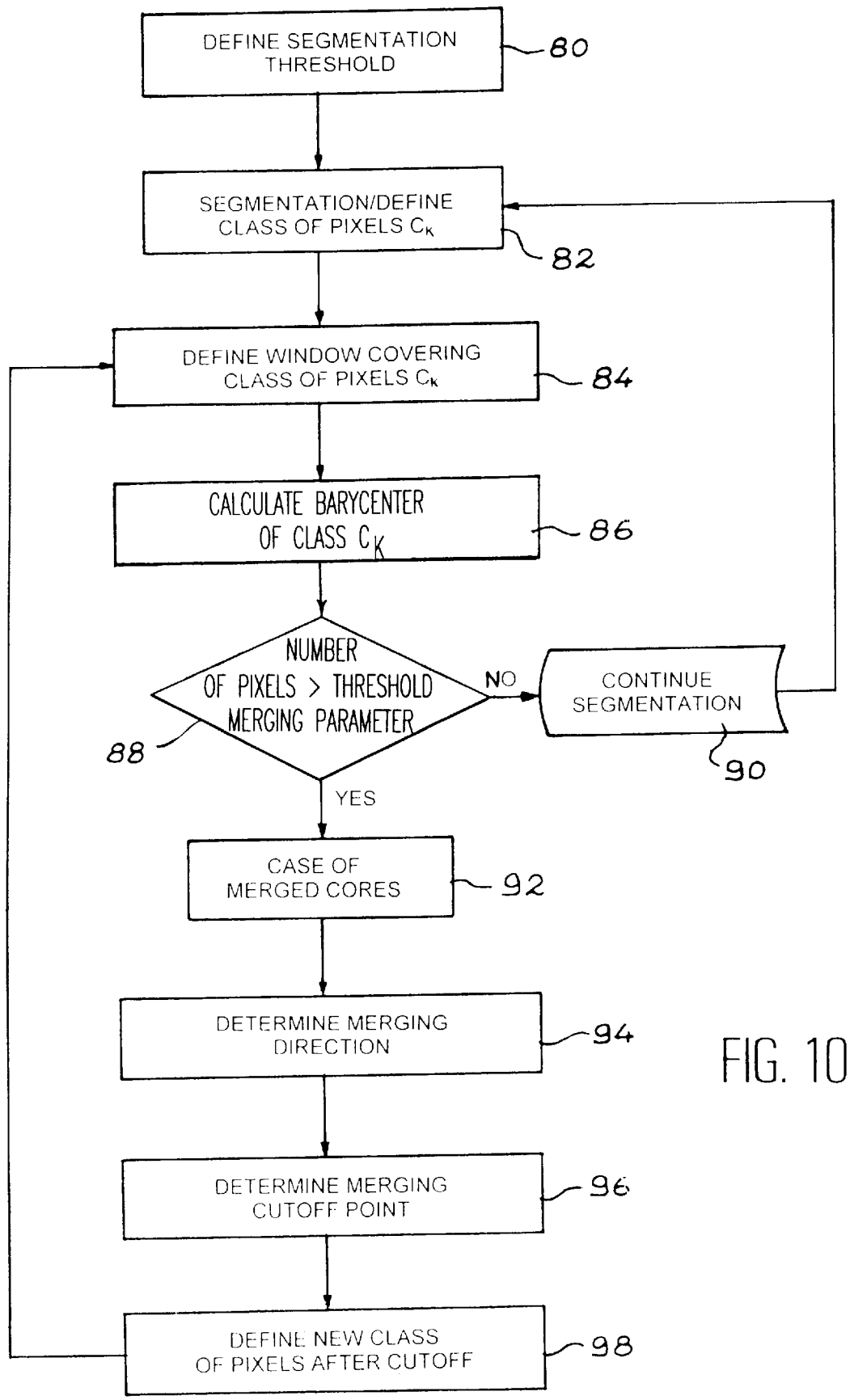
FIG. 10 is a flowchart summarizing the steps of processing a reference image (segmentation procedure) according to the present invention.

Next a merging direction is determined (FIG. 10, step 94). Strictly speaking, the merging direction (e.g., direction $\Delta$ in FIG. 9A) is of a random nature in a plane of the image. However, in order to reduce the number of calculations, four directions are fixed in the window 76, one of which is allocated as the merging direction to the group of merged cores 74. Thus, selection takes place of one of a vertical $D_v$, a horizontal $D_h$, a +45° ($D_+$), and a -45° ($D_-$) direction of FIG. 9B as the merging direction of the group of merged cores 74 as follows. The number of pixels within the group of merged cores 74 along each of the vertical $D_v$, the horizontal $D_h$, the +45° ($D_+$), and the -45° ($D_-$) directions is calculated. The direction retained as the merging direction is the direction of the four directions along which a number of pixels is a maximum. Accordingly, in FIG. 9B, the horizontal direction $D_h$ is retained as the merging direction of the group of merged cores 74. In this case, the perpendicular direction $D_v$ is determined to be a cutoff direction (if the merging direction were $D_+$ then the cutoff direction would be $D_-$, etc.).

Figure 9C:
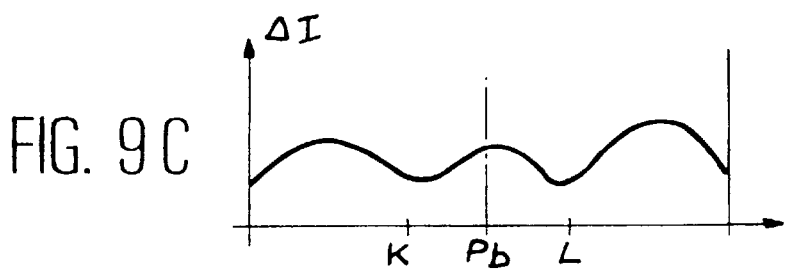

Starting from the barycenter $P_b$ of group 74 a displacement occurs in the merging direction. In the case of horizontal merging, as shown in FIG. 9B, the displacement direction is from left to right. In the case of a vertical merging, the displacement direction is upwards. In the case of a merging at +45° or −45°, the displacement direction is to the extreme right and upwards or extreme left and upwards. These directions are with respect the scanning of the image (from top to bottom and left to right). Thus, successively all the pixels in the displacement direction along the merging direction are analyzed and an intensity variation between two adjacent pixels is measured, for example, as shown in FIG. 9C. In FIG. 9C, variation along the direction $D_h$ on either side of the barycenter $P_b$ are shown. When a minimum is encountered, for example at point K, the point K is interpreted as a merging cutoff point between to adjacent merged cores (FIG. 10, step 96). Thus, through the point K a cutoff line passes which is parallel to the cutoff direction $D_v$. This cutoff line defines two cores 74$a$ and 74$b$, within the group of merged cores 74. In this same way, through a point L a cutoff line passes which is parallel to the cutoff direction D, and which defines two cores 74$b$ and 74$c$, within the group of merged cores 74. For each of the cores 74$a$, 74$b$ and 74$c$ of merged cores 74, it is then possible to calculate a barycenter or maximum intensity point to which is allocated a total intensity transmitted by the core, as previously discussed. As previously discussed with reference to FIG. 7E, the response of each core to the light signal which it receives is defined by the sum of the intensities of the pixels belonging to the core. The response of individual cores of a merged core group is determined in the same way as with non-merged cores, once the merged cores are segmented according to the method disclosed with reference to FIGS. 8 and 9A to 9C.

When the above segmentation procedure is completed, a determination is made with reference to a total number of cores $C_k$ obtained by the segmentation process as will now be discussed. If the total number of cores $C_k$ is below a given threshold, which is, for example, a fraction, such as 80% to 85% of the total number of cores specified by a manufacturer of the multicore fiber, the segmentation operation is repeated (FIG. 10, step 90), for pixels not already belonging to a detected core. Moreover, during the second iteration, the segmentation threshold is lowered in order to be able to regroup pixels with a lower intensity than the pixels of the first iteration. The defined threshold for this operation is dependent on the type of fiber and total number of cores in the fiber. In general, it is between 70% and 80% of the total number of cores given by the manufacturer. However, second iteration tends to occur for pixels located at an edge of an image and due to noise these pixels are of a lower intensity than the pixels of the first iteration. This process is repeated until all of the pixels have been processed.

Figure 11:
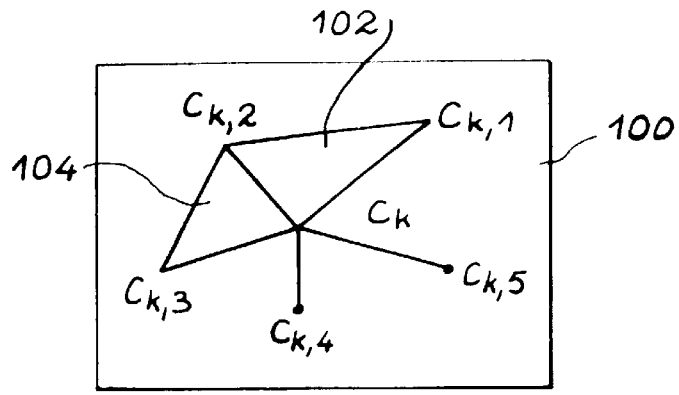
FIGS. 11A to 11C diagrammatically illustrate various steps in determining a triangular matrix of three cores of a multicore fiber and processing pixels within the triangular matrix according to the present invention.
Figure 11:
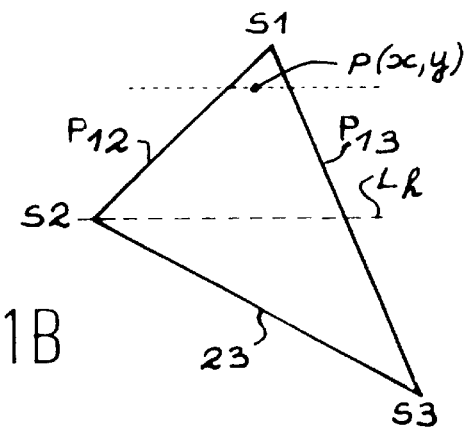
Figure 11:
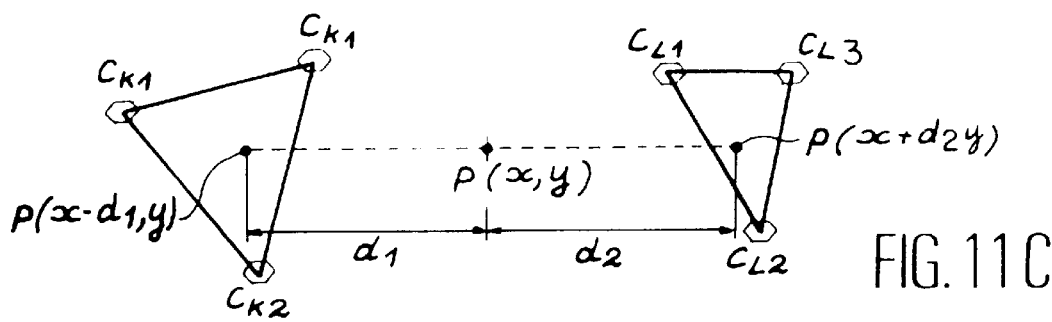

A method for determining a triangular matrix of cores of an image will now be described. This method makes it possible to allocate to each pixel a triangle comprising three cores from which an intensity interpolation is performed as previously discussed. For collecting cores of an image in groups of three to form the triangular matrix, one method is to first determine, for each core, the assembly of its neighbors and to carry out forming of the triangular matrix on the basis of this assembly. The matrix of points or pixels representative of the cores is scanned by a square window, centered on the representative plane of each core. The size of the widow is dependent on the intercore space and the type of fiber which is specified by the multicore fiber manufacturer. Typically, windows of 10×10 pixels or 7×7 pixels are used. All the cores with a representative point located within the window form part of a vicinity of central cores of the window. FIG. 11A shows a representative point $C_k$ of a core, a window 100 centered on the core $C_k$ and all the surrounding cores $C_{k,1}$, . . . $C_{k,5}$ forming part of the vicinity of cores of core $C_k$. The triangles are then constructed from a central core and two consecutive adjacent cores. Thus, in FIG. 11A, the triangle 102 is determined from the cores $C_k$, $C_{k,1}$ and $C_{k,2}$. The triangle 104 is determined from the cores $C_k$, $C_{k,2}$ and $C_{k,3}$. Once a triangle has been determined (e.g., triangle 102), all the pixels contained within the triangle are allocated a code corresponding to the triangle as previously discussed. In other words, for each pixel within a given triangle (e.g., triangle 102 having apices $C_k$, $C_{k,1}$ and $C_{k,2}$), the interpolation procedure previously described will take place relative to the three apices of the triangle. More specifically, to determine the pixels belonging to a triangle having apices $S_1$, $S_2$ and $S_3$, the following procedure is applied as will now be described with reference to FIG. 11B:

(a) determine an upper apex $S_1$, a lower apex $S_3$ and a "middle" apex $S_2$ which is defined as an apex located between the two other apices $S_1$ and $S_3$ along a vertical axis;

(b) divide the surface of the triangle into two parts separated by the horizontal line $L_h$, passing through the "middle" apex $S_2$;

(c) determine sides $P_{12}$, and $P_{13}$ of the triangle respectively linking the upper apex $S_1$ to the "middle" apex $S_2$ and lower apex $S_3$;

(d) linewise scan from the upper apex $S_1$ towards the line $L_h$ and determine a section of a line located between the two defined sides $P_{12}$ and $P_{13}$ for each scanned line;

(e) allocate to pixels located on the section of the line for each linewise scan the three cores $S_1$, $S_2$ and $S_3$ constituting the apices of the triangle;

(f) before processing each pixel, determine whether or not the given pixel is already encoded (e.g., to avoid any triangle overlap); and (g) repeat the operations steps (c) to (f) for the lower part of the triangle, except using triangle sides $P_{23}$ and $P_{13}$ respectively linking the lower apex $S_3$ with the "middle" apex $S_2$ and the upper apex $S_1$.

Before processing a triangle, it is possible to make a determination as to whether or not a side of a given triangle is horizontally aligned along a line of pixels. If no side of a given triangle is horizontally aligned along a line of pixels, then steps (a) to (f) are performed. However, if one side of a given triangle is aligned along a line of pixels, it is unnecessary to make a differentiation between the upper part and lower part of the triangle. By making this determination, it is possible to reduce the processing time by a factor of approximately 2 for a given triangle. Thus, in the particular case of a triangle, wherein one of the sides is aligned horizontally along a line of pixels, the time for filling the triangle with pixels is significantly lower than the time of filling a triangle whose apices are arranged in a random manner.

The procedure described above does not make it possible to associate all pixels of an image with a corresponding triangle because certain pixels may not have a vicinity of adjacent cores in the window 100 of FIG. 11A from which to form the corresponding triangles. Accordingly, once the triangulation procedure is finished, a determination is made as to whether or not there are pixels having no associated triangle. This step is easily accomplished since, as previously discussed, as soon as a pixel is allocated to a triangle, a code corresponding to the triangle is allocated to the pixel.

Accordingly, pixels having no associated triangle are easily found and a method of associating these pixels with a core of triangles will now be described with reference to FIG. 11C. In FIG. 11C, two triangles $C_{K1}$, $C_{K2}$, $C_{K3}$ and $C_{L1}$, $C_{L2}$, $C_{L3}$, are shown which are determined in the manner previously described. A pixel p(x, y) is located between these two triangles, but belongs to neither. One method for allocating a triangle of cores to the pixel p(x, y) consists of carrying out a search in a specific direction, for example, the horizontal direction, to find the closest pixels belonging to a triangle. For example, in the case of FIG. 11C, a scan along the line passing through the pixel p(x, y) makes it possible to determine closest pixels $p(x-d_1, y)$ and $p(x+d_2, y)$ respectively located at a distance $d_1$ and a distance $d_2$ to the left and right of pixel p(x, y). Pixels $p(x-d_1, y)$ and $p(x+d_2, y)$ each belong to a triangle, and have been previously encoded as a function of the triangle to which they belong. Thus, each pixel $p(x-d_1, y)$ and $p(x+d_2, y)$ has associated a triangle having three cores as apices of the triangle. The distances from the pixel p(x, y) to the six cores forming apices of two triangles are calculated and ordered. From this calculation, three cores or points representing the cores closest to the pixel p(x, y) are selected and associated with the pixel p(x, y). Thus, in FIG. 11C, the distance of the pixel p(x, y) from each of the apices $C_{K1}$, $C_{K2}$, $C_{K3}$ $C_{L1}$, $C_{L2}$, and $C_{L3}$ will be respectively calculated. From these calculations, it could be determined, for example, that pixel p(x, y) is to be associated with a triangle comprising cores $C_{K1}$, $C_{L1}$, and $C_{K2}$ as apices of the triangle. In this way, all the pixels of an image will be associated with a single triangle of cores for the subsequent interpolation procedure. Taking into account pixels not associated with a triangle of cores makes it possible to improve a processed image, particularly at edge portions of the processed image, as compared to a method not employing this procedure. The above described procedure is applied to the reference image and can be used for all object images assuming that the same multicore fiber is used to generate the reference image and the object images.

Methods for enhancing an obtained image according to the present invention will now be described. Contrast enhancing is important when a visual perception of information in an image is limited by small grey level variations of various portions of the image. Contrast enhancement modifies an appearance of an image in such a way that an observer or machine can more easily extract a particular piece of information from the image. The enhancing methods that will now be described are based on a redefinition of a value of pixels of an original image by histogram modification. Enhancing is obtained by redeploying a histogram of intensities in order to give an equal weight to all grey levels. Therefore very dense intensity level pixels are forced to occupy other less dense levels and the grey scale is widened. As a result there is a significant contrast enhancement. The above enhancement procedure amounts to attributing to each pixel a new grey level value by means of a transformation function F given by:

$$I_p'=F(I_p,x,y,q_1, \ldots, q_m)$$

in which $I_p'$ represents the transformed value of the pixel p, $I_p$ is the original value of the pixel p, x and y are the coordinates of the pixel p in the image, and $q_1, \ldots q_m$ are transformation parameters. According to a first or global approach, the function F is applied to each pixel, independently of its vicinity, and is determined on the basis of the histogram of the complete image. The histogram section to be "widened" is determined from an a prior fixed threshold S'. The intensities whose number of pixels exceeds the threshold S' form part of the section to be "widened". The value of the threshold S' is estimated with the eye and is dependent on the level of the contrast of the original image.

Figure 12:
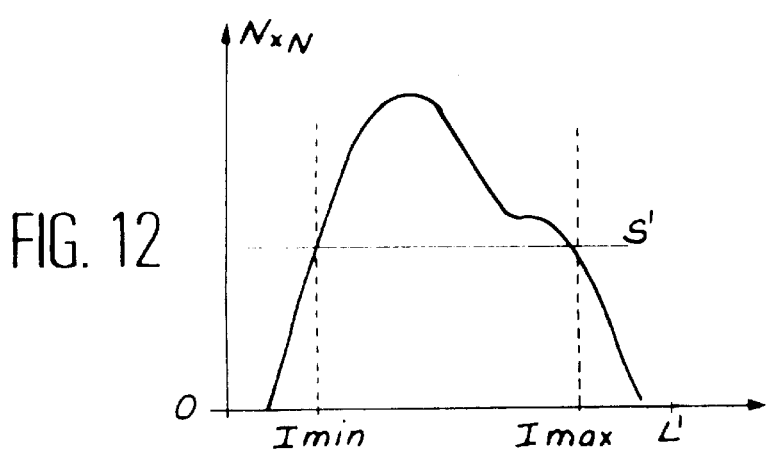
FIG. 12 illustrates a method of extending a histogram for effecting an image enhancing step according to the present invention.

As shown in FIG. 12, a new dynamic range is defined. The new dynamic range is limited by two extreme intensities $I_{max}$ and $I_{min}$ of the widened section. The L' grey levels of the dynamic range (e.g., L'=256) are distributed over the new dynamic range, in order to determine a quantification step $\Delta_q$ given by:

$$\Delta_q = L'/(I_{max}-I_{min}+1)$$

To the intensities belonging to the dynamic range are attributed a new value in accordance with the following relation:

$$I_p' = (I_p - I_{min}) \times \Delta_q$$

For intensities outside the histogram section to be "widened", the transformation is different:

if $I_p < I_{min}$, then $I_p = I_{min}$ if $I_p > I_{max}$, then $I_p = I_{max}$ These above operations make it possible to distribute pixels of dense regions in less dense regions and obtain a widened, uniform histogram and therefore a better contrast.

According to another or so-called local approach, vicinity regions centered on each pixel are provided and the function F is calculated according to the cumulative histogram of the considered region. The transformed value of a pixel p is calculated according to the following relation:

$$I_p' = L' \times (H_{cum}(I_p))/(N_w \times N_w)$$

in which L' designates the dynamic range (e.g., 256), $H_{cum}(I_p)$ is a value of a cumulative histogram at an intensity $I_p$, and $N_w \times N_w$ is a size of the region (sliding window). Thus, the new value of the pixel is obtained as a function of the characteristics of its vicinity. The results are more satisfactory than in the case of the global approach, but there are a few problems:

(a) exaggerated enhancing of the noise in the homogeneous regions where the histogram of the intensities has peaks;

(b) the presence of defects in the boundaries between the regions scanned by the sliding window; and (c) relatively long calculation time, due to the individual processing of each image pixel.

Another local method makes it possible to solve the noise problem. In general, in medical images, there are two types of noise:

(a) background noise present in the "black" zone of the dynamic range of the image; and (b) noise due to fluctuations in homogeneous regions of the object (organ), the intensity variations being sometimes interpreted as the texture of the organ. Thus, these two types of noise are characterized by grey level variations in a narrow range of a global histogram of the image. However, in certain regions of the image, the contribution of the noise can be dominant. After applying the local enhancing of the histogram in these regions, the fluctuations of the noise become more visible. This problem can be solved by limiting the level of the enhancement in these regions. For this purpose, the enhancing of the contrast is characterized by a value of a gradient of the transformation function linking the input intensity to the output intensity. A gradient of value 1 has no enhancement and a high value of the gradient corresponds to a significant enhancement. Thus, the limitation of the enhancement of the noise is obtained by limiting the gradient of the transformation function. According to the above relation, $I_p^t$ is proportional to $H_{cum}$ (cumulative histogram).

In view of the fact that a histogram of intensities is only a derivative of the cumulative histogram, a gradient of a transformation function at a given intensity, in other words the enhancing of the contrast, is proportional to the value of the histogram at this intensity:

$$d(I_p^t)/d(I_p) = (L'/(N_w \times N_w)) \times (H_{orig}(I_p))$$

in which $H_{orig}(I_p)$ is the value of the original histogram at the intensity $I_p$. Therefore to limit the gradient of the function, the histogram is limited to a constant value (cl). The value cl is a multiple of the mean number of pixels per intensity level. This multiple is defined by a constant cl, which is a priori fixed value:

$$cl = c_f \times L'(N_w \times N_w)$$

The constant $c_f$ is chosen in accordance with the characteristics of the image and is fixed for all the regions. However, the value cl varies in accordance with the size of the window. For example, at the edge of the image, where the size of the window is smaller, the calculated value for cl is higher than that of the other regions. After limiting the histogram, the histogram is standardized, because the range of input intensities is equal to the range of output intensities. Thus, all the pixels which were beyond the limit value cl are redistributed over the entire dynamic range (FIG. 12). If R is the number of redistributed pixels per intensity and S' the number of pixels exceeding the value cl then R=S'/L', then, after standardization, the histogram is redefined in the following way:

$$H_{orig}(I_p) > cl, \text{ then } K^t(I_p) = cl$$

$$\text{else } H^t(I_p) = H_{orig}(I_p) + R$$

in which $H^t(I_p)$ is the value of the transformed histogram for the intensity $I_p$. On the basis of this histogram, determination takes place of the new cumulative histogram and the function of the transformation.

The solution to the problems of the presence of defects and the long calculation time consists, in a local method as previously described, of modifying the step or spacing of the sliding window displacement (see, for example, K. W. Leszczynski and S. Shalev, "Image and Vision Computing", vol. 7, No. 3, pp 205–209, 1989). The image is sampled in accordance with a defined pattern or frame (e.g., rectangular or hexagonal). The pixels of the frame constitute the centers of the sliding window. The function F is calculated for each window. The value obtained gives the new intensity value for the pixel, which is the center of the region. For pixels not forming part of the sampling frame, it is necessary to interpolate the intensity value of the closest centers. This interpolation can take place in two directions. However, in order to reduce the accumulated error due to bilinear interpolation, the sampling frame is only defined in one direction (horizontal or vertical) and the interpolation function is applied to the collinear pixels with the pixels of the frame.

In the following relation $I_p$, $w_0$–$I_p$, $w_1$ represent the transformed values of the pixel p(x, y), obtained from calculated functions in two adjacent regions centered respectively at the pixels $w_0$ and $w_1$. The interpolated intensity value $I_p^{int}$ of the pixel p is calculated according to the following relation:

$$I_p^{int} = I_p^t, w_0 + [ax(I_p^t, w_0 - I_p^t, w_1)], \text{ where } d = y_p - y_{w0} \text{ and } a = d/N_w$$

For the pixels at the edge of the image, there is only one neighboring region, i.e., the interpolation has not taken place for these pixels. The choice of the interpolation direction is dependent on the structure of the image. If the contrast varies rapidly in the vertical direction, the horizontal interpolation introduces less error than vertical interpolation. This method is less burdensome as regards the number of arithmetic operations. For example, for the local method in its general form previously described, the number of multiplications and divisions is equal to approximately $3 \times (N \times N)$, whereas in the interpolated version this number is $2 \times (n \times N)$, ($N \times N$) being the size of the image.

Although in the preferred embodiment of processing a digitized image obtained by a multicore fiber or a multifiber is described in terms of interpolation, convolution processing of digitized images could be performed as will be readily apparent to those skilled in the art. However, the process according to the present invention is advantageous in that it just requires two multiplications and three additions per point or pixel (see equations 2.1, 2.2 and 2.3 above) whereas convolution processing implies at least $N^2$ multiplications and N additions ($N \geq 2$, most often with $N \geq 3$). The process according to the invention therefore saves calculation steps.

Although in the preferred embodiment of processing a digitized image obtained by a multicore fiber or a multifiber is described in terms of digitized images, the present invention can be applied to black and white images as well as to color images, wherein in the case of color images, the digitized image is decomposed into three basic images, one for each color red, green, and blue, each basic image processed according to the present invention, with a color image obtained using a color camera 36 as will be readily apparent to those skilled in the art.

Although in the preferred embodiment of processing a digitized image obtained by a multicore fiber or a multifiber is described in terms of intensity values for each pixel obtained by interpolating intensities of three cores, or a triangle defined by these three cores, other number of cores could be used for the interpolation by making a trade off between processing time and interpolation accuracy as will be readily apparent to those skilled in the art.

Although in the preferred embodiment of processing a digitized image obtained by a multicore fiber or a multifiber is described in terms of applications in the medical field, the present invention can be applied to industrial applications, such as semiconductor inspection, robotic inspection, etc. to examine images of industrial objects as will be readily apparent to those skilled in the art.

The present invention may be implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product, implementing the processing of a digitized image obtained by a multicore fiber or a multifiber, which may be on a storage medium including instructions which can be used to program a general purpose computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for processing a digitized image obtained by a multicore fiber or a multifiber, comprising the steps of:

calculating for each core of the multicore fiber or the multifiber, a transmitted intensity equal to a sum of intensities of pixels of the digitized image located within a predefined zone around each core;

calculating a standardized intensity for each core, by dividing the transmitted intensity by an intensity transmitted by a corresponding core in a reference image; and calculating an interpolated value of an intensity of each pixel of the digitized image, as a function of standardized intensities of three cores of a predetermined triangular matrix and a relative position of each pixel with respect to the three cores.

2. The method according to claim 1, further comprising the steps of:

defining the predefined zone around each core on the reference image; and transposing the predefined zone on an object image.

3. The method according to claim 1, further comprising the step of:

defining a surface of the predefined zone around each core by midperpendiculars passing between a barycenter of each core and barycenters of cores adjacent to each core.

4. The method according to claim 1, further comprising the step of:

defining a surface of the predefined zone around each core by midperpendiculars passing, in the reference image, between a maximum intensity pixel of each core and maximum intensity pixels of cores adjacent to each core.

5. The method according to claim 1, further comprising the step of:

associating each pixel of the digitized image with previously defined three closest cores.

6. The method according to claim 1, further comprising the step of:

enhancing an interpolated object image using a transformation function.

7. The method according to claim 6, wherein the enhancing step comprises:

enhancing an interpolated object image using a transformation function and global enhancement.

8. The method according to claim 6, wherein the enhancing step comprises:

enhancing an interpolated object image using a transformation function and local enhancement using a sliding window.

9. The method according to claim 8, further comprising the step of:

limiting the gradient of the transformation function.

10. A method of diagnosing a medical image, comprising the step of:

generating an image of part of a body of a patient using processing according to claim 1.

11. The method according to claim 10, further comprising the step of:

carrying out the diagnosis at a location where the image is generated.

12. The method according to claim 10, further comprising the step of:

carrying out the diagnosis at a location remote from a location where the image is generated.

13. A method for processing a digitized image obtained by a multicore fiber or a multifiber, using a reference image obtained from the multicore fiber or the multifiber, comprising the steps of:

determining a barycenter or maximum intensity pixel for each core of the multicore fiber or the multifiber on the reference image;

calculating a definition zone around each core;

calculating a transmitted intensity equal to a sum of intensities of pixels of the digitized image located within the definition zone for each core of the multicore fiber or the multifiber;

calculating a standardized intensity by dividing the transmitted intensity of each core by an intensity transmitted by each core in the reference image for each core of the multicore fiber or the multifiber; and calculating an interpolated value of an intensity as a function of the standardized intensities of three cores of a predetermined triangular matrix and a relative position of each pixel with respect to the three cores for each pixel of the digitized image.

14. The method according to claim 13, further comprising:

calculating a digital mask which defines a zone of an image within which the determination of the barycenter or maximum intensity pixel and a calculation of the definition zone around each core is carried out.

15. The method according to claim 13, the step of determining the barycenter or maximum intensity pixel is preceded by the following step:

determining for each pixel of the reference image, all pixels which surround each pixel and which have an intensity exceeding a predetermined threshold T.

16. The method according to claim 15, wherein the step of determining pixels with an intensity exceeding T comprises:

determining for each pixel of the reference image, all pixels which surround each pixel and which have an intensity exceeding a predetermined threshold T for each pixel of the reference image, whether or not each pixel is located at an edge of the reference image.

17. The method according to claim 15, the step of determining pixels with an intensity exceeding T comprises:

determining for each pixel of the reference image, all pixels which surround each pixel and which have an intensity exceeding a predetermined threshold T linearly and changing direction as soon as a pixel of intensity below the threshold T is encountered or as soon as an edge pixel is detected.

18. The method according to claim 13, wherein the step of calculating the definition zone around each core, comprises the step of:

associating, with the barycenter or maximum intensity pixel of each core, a surface limited by midperpendiculars between each core and cores adjacent to each core.

19. The method according to claim 13, wherein the step of determining a barycenter or maximum intensity pixel for each core, comprises the steps of:

processing all cores including groups of merged cores, including the steps of, determining a presence of groups merged cores, and calculating a barycenter or maximum intensity pixel of each core within a group of merged cores.

20. The method according to claim 19, wherein the step of processing all cores including merged cores, further comprises the steps of:

determining a geometrical barycenter of pixels forming each group of merged cores;

determining a merging direction, a cutoff direction, and cutoff points for each group of merged cores; and segmenting individual cores from each group of merged cores in accordance with the merging direction, the cutoff direction, and the cutoff points of each group of merged cores.

21. The method according to claim 13, wherein prior to the step of determining a barycenter or maximum intensity pixel for each core, the following step is performed:

determining triangular matrices of the reference image, such that each barycenter or maximum intensity point of each core of the multicore fiber or the multifiber is associated with a triangular matrix of the triangular matrices, and such that each pixel of the digitized image is associated with barycenters or maximum intensity points of three cores of the triangular matrices.

22. The method according to claim 21, wherein the step of determining the triangular matrices, comprises the steps of:

determining, for each barycenter or maximum intensity point, barycenters or maximum intensity points which are immediately adjacent to each barycenter or maximum intensity point; and determining pixels belonging to each triangle formed by two barycenters or maximum intensity points, chosen adjacent to one another among the barycenters or maximum intensity points which are immediately adjacent to a considered barycenter or maximum intensity point; and for each pixels not belonging to a triangle, performing the steps of:

determining the two closest pixels, belonging to a triangle, each of the closest pixels associated with three barycenters or maximum intensity points, for a total of six barycenters or maximum intensity points; and determining, from the six barycenters or maximum intensity points, the closest three barycenters or maximum intensity points to be associated with a pixel not belonging to a triangle.

23. An apparatus for processing a digitized image obtained by a multicore fiber or a multifiber, comprising:

means for calculating for each core of the multicore fiber or the multifiber, a transmitted intensity equal to a sum of intensities of pixels of the digitized image located within a predefined zone around each core;

means for calculating a standardized intensity for each core, by dividing the transmitted intensity by an intensity transmitted by a corresponding core in a reference image; and means for calculating an interpolated value of an intensity of each pixel of the digitized image, as a function of standardized intensities of three cores of a predetermined triangular matrix and a relative position of each pixel with respect to the three cores.

24. The apparatus according to claim 23, further comprising:

means for defining the predefined zone around each core on the reference image; and means for transposing the predefined zone on an object image.

25. The apparatus according to claim 23, further comprising:

means for associating each pixel of the digitized image with previously defined three closest cores.

26. The apparatus according to claim 23, further comprising:

means for enhancing an interpolated object image using a transformation function.

27. An apparatus for processing a digitized image obtained by a multicore fiber or a multifiber, using a reference image obtained from the multicore fiber or the multifiber, comprising:

means for determining a barycenter or maximum intensity pixel for each core of the multicore fiber or the multifiber on the reference image;

means for calculating a definition zone around each core;

means for calculating, for each core of the multicore fiber or the multifiber, a transmitted intensity, equal to a sum of intensities of pixels of the digitized image located within the definition zone;

means for calculating, for each core of the multicore fiber or the multifiber, a standardized intensity, by dividing the transmitted intensity of each core, by an intensity transmitted by each core in the reference image; and means for calculating, for each pixel of the digitized image, an interpolated value of an intensity, as a function of the standardized intensities of three cores of a predetermined triangular matrix and a relative position of each pixel with respect to the three cores.

28. The apparatus according to claim 27, further comprising:

means for calculating a digital mask which defines a zone of an image within which the determination of the barycenter or maximum intensity pixel and a calculation of the definition zone around each core is carried out.

29. The apparatus according to claim 27, further comprising:

means for determining for each pixel of the reference image, all pixels which surround each pixel and which have an intensity exceeding a predetermined threshold T.

30. The apparatus according to claim 27, wherein the means for calculating the definition zone around each core, comprises:

means for associating, with the barycenter or maximum intensity pixel of each core, a surface limited by midperpendiculars between each core and cores adjacent to each core.

31. The apparatus according to claim 27, wherein the means for determining a barycenter or maximum intensity pixel for each core, comprises:

means for processing all cores including groups of merged cores, including, means for determining a presence of groups merged cores, and means for calculating a barycenter or maximum intensity pixel of each core within a group of merged cores.

32. The apparatus according to claim 31, wherein the means for processing all cores including merged cores, further comprises:

means for determining a geometrical barycenter of pixels forming each group of merged cores;

means for determining a merging direction, a cutoff direction, and cutoff points for each group of merged cores; and means for segmenting individual cores from each group of merged cores in accordance with the merging direction, the cutoff direction, and the cutoff points of each group of merged cores.

33. The apparatus according to claim 27, further comprising:

means for determining triangular matrices of the reference image, such that each barycenter or maximum intensity point of each core of the multicore fiber or the multifiber is associated with a triangular matrix of the triangular matrices, and such that each pixel of the digitized image is associated with barycenters or maximum intensity points of three cores of the triangular matrices.

34. An apparatus for processing a digitized image obtained by a multicore fiber or a multifiber, comprising:

a first processor section configured to calculate for each core of the multicore fiber or the multifiber, a transmitted intensity equal to a sum of intensities of pixels of the digitized image located within a predefined zone around each core;

a second processor section configured to calculate a standardized intensity for each core, by dividing the transmitted intensity by an intensity transmitted by a corresponding core in a reference image; and a third processor section configured to calculate an interpolated value of an intensity of each pixel of the digitized image, as a function of standardized intensities of three cores of a predetermined triangular matrix and a relative position of each pixel with respect to the three cores.

35. An apparatus for processing a digitized image obtained by a multicore fiber or a multifiber, using a reference image obtained from the multicore fiber or the multifiber, comprising:

a first processor section configured to determine a barycenter or maximum intensity pixel for each core of the multicore fiber or the multifiber on the reference image;

a second processor section configured to calculate a definition zone around each core;

a third processor section configured to calculate, for each core of the multicore fiber or the multifiber, a transmitted intensity, equal to a sum of intensities of pixels of the digitized image located within the definition zone;

a fourth processor section configured to calculate, for each core of the multicore fiber or the multifiber, a standardized intensity, by dividing the transmitted intensity of each core, by an intensity transmitted by each core in the reference image; and a fifth processor section configured to calculate, for each pixel of the digitized image, an interpolated value of an intensity, as a function of the standardized intensities of three cores of a predetermined triangular matrix and a relative position of each pixel with respect to the three cores.

36. A computer program product, comprising:

a computer storage medium and a computer program code mechanism embedded in the computer storage medium for causing a computer to process a digitized image obtained by a multicore fiber or a multifiber, the computer program code mechanism comprising:

a first code segment configured to calculate for each core of the multicore fiber or the multifiber, a transmitted intensity equal to a sum of intensities of pixels of the digitized image located within a predefined zone around each core;

a second code segment configured to calculate a standardized intensity for each core, by dividing the transmitted intensity by an intensity transmitted by a corresponding core in a reference image; and a third code segment configured to calculate an interpolated value of an intensity of each pixel of the digitized image, as a function of standardized intensities of three cores of a predetermined triangular matrix and a relative position of each pixel with respect to the three cores.

37. A computer program product, comprising:

a computer storage medium and a computer program code mechanism embedded in the computer storage medium for causing a computer to process a digitized image obtained by a multicore fiber or a multifiber, using a reference image obtained from the multicore fiber or the multifiber, the computer program code mechanism comprising:

a first code segment configured to determine a barycenter or maximum intensity pixel for each core of the multicore fiber or the multifiber on the reference image;

a second code segment configured to calculate a definition zone around each core;

a third code segment configured to calculate, for each core of the multicore fiber or the multifiber, a transmitted intensity, equal to a sum of intensities of pixels of the digitized image located within the definition zone;

a fourth code segment configured to calculate, for each core of the multicore fiber or the multifiber, a standardized intensity, by dividing the transmitted intensity of each core, by an intensity transmitted by each core in the reference image; and a fifth code segment configured to calculate, for each pixel of the digitized image, an interpolated value of an intensity, as a function of the standardized intensities of three cores of a predetermined triangular matrix and a relative position of each pixel with respect to the three cores.

* * * * *